Oct. 18, 1932.  E. A. ROCKWELL  1,882,926
POWER BRAKE APPARATUS
Filed June 15, 1929   2 Sheets-Sheet 1
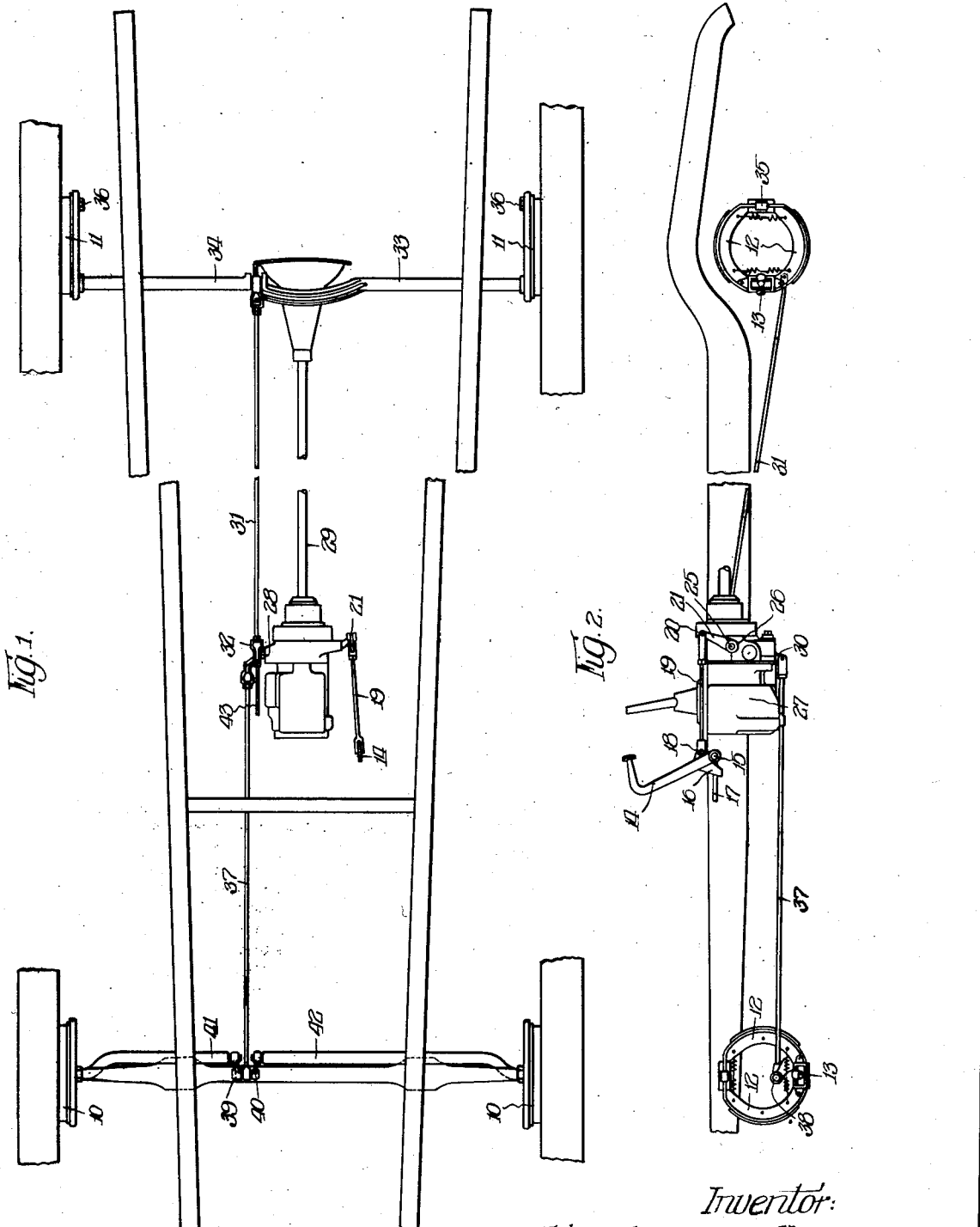
Inventor:
Edward A. Rockwell,
By Wilkinson Huxley Byron + Knight
attys.

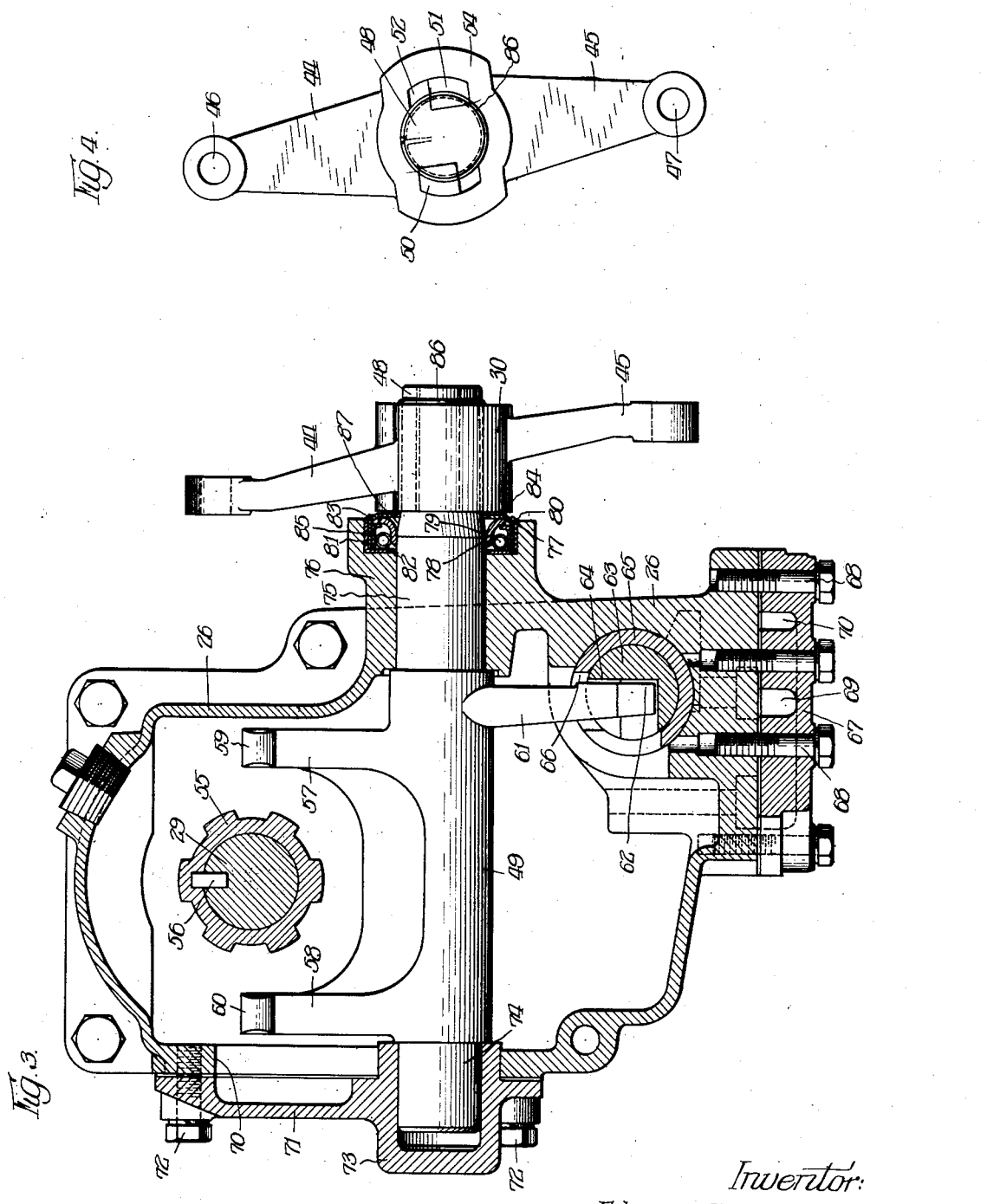

Patented Oct. 18, 1932

1,882,926

UNITED STATES PATENT OFFICE

EDWARD A. ROCKWELL, OF CHICAGO, ILLINOIS

POWER BRAKE APPARATUS

Application filed June 15, 1929. Serial No. 371,109.

This invention relates to improvements in power brake apparatus and especially to power brake apparatus which is associated with the propeller shaft of a vehicle in such a manner that the operator may selectively control the actuation of the power brake unit and the wheel brakes will be applied by the actuation of the power brake unit due to the energy of the rotating propeller shaft.

Power brake apparatus of the type to which the present improvements are applicable has been previously disclosed in my copending applications Serial No. 224,846, filed October 8, 1927, and Serial No. 365,071, filed May 22, 1929.

It is principally the object of the present invention to provide an improved construction of the power brake casing and the operating means enclosed within and extending from the casing whereby a small number of parts are required and the assembly of the apparatus is simplified. Power brake constructions as previously disclosed may comprise a casing which encloses the power shaft upon which an operating sleeve is laterally movable, the lower portion of the casing including a dashpot construction. In order to transmit the movement of the laterally movable sleeve to the brake rods which are connected to a brake lever mounted outside of the casing, it is necessary to use a rock lever pivoted on an axis transverse to the propeller shaft. The rock lever may include upwardly extending yoke arms, which bear in thrust engagement with the operating sleeve, and a depending arm for engagement with the dashpot plunger. The pivot shaft for the rock lever extends outside of the casing, and the brake lever is mounted on the outwardly extending end.

It is an object of the present invention to form the rock lever together with the arms integrally, and to so construct the casing and the dashpot that the rock lever may be readily assembled through an opening in the side of the casing.

Further objects and advantages will be more readily apparent from the following description taken in connection with the attached drawings, in which—

Figure 1 is a diagrammatic chassis layout illustrating the connections from the brakes to the power unit and the control connections therefor;

Figure 2 is a diagrammatic side elevation of a chassis layout as shown in Figure 1;

Figure 3 is a vertical section taken through the power brake unit transverse to the propelled shaft and illustrating the internal construction; and Figure 4 is a side elevation of the brake lever and shows its connections to the rock lever.

In the drawings, 10—10 are a pair of front brakes and 11—11 are a pair of rear brakes. The brakes include internally expanding shoes 12—12, which are actuated by cams 13. A brake pedal 14 is provided at 15 to a fixed part of the frame and is provided with a stop 16 for engaging a portion 17 of the frame to limit its upward movement. The rear side of the brake pedal is pivoted at 18 to an adjustable link connection 19 attached at the pivot 20 to a lever 21, which serves to actuate the power device to provide power operation of the braking mechanism. The lever 21 is secured to the end of a pivot cross shaft 25 mounted in the power brake casing 26, which is located at the rear of the customary transmission housing 27. A rock shaft 28, arranged transverse to the propeller shaft 29 of the vehicle, is operated by the power device and has a double arm lever 30 secured to its end on the side opposite the brake pedal side of the mechanism. This lever 30 is connected at its upper end to the pull rod 31 by the coupling 32. The pull rod 31 is adapted to transmit power to the rear brake operating shafts 33 and 34.

As shown in Figure 2, the shaft 33 will actuate the cam 13 to expand the rear brake shoes 12—12. The construction of the brake shoe assembly includes an adjustable pivot 35, which is adjusted by an exterior nut 36 to move the shoes toward or away from the drum. The lower end of the double arm lever 30 has a pull rod 37 secured thereto, which is connected at the pivot 38 to lever arms 39 and 40. The lever arms 39 and 40 actuate the cross shafts 41 and 42 to turn the cams 13 which expand the brake shoes. An emergency pull rod 43 is connected to the upper arm of the double arm lever 30 at the coupling member 32, whereby a direct pull may be had to apply the rear brakes upon actuation of the emergency lever.

As shown more in detail in Figures 3 and 4, the double arm lever 30 includes the upwardly extending arm 44 and the depending arm 45. The upper arm has a pivot opening 46 adapted for connection to the rear brake rod and the emergency pull rod, while the lower arm 45 has a pivot opening 47 for connection to the front brake rod. The lever 30 is mounted on the end 48 of a rock lever 49. The end 48 includes openings to receive buttress keys 50 and 51, which are received in elongated openings 52 and 53 formed in the central boss 54 of the lever 30. Thus it will be apparent that lever 30 is free to be moved by the emergency connection without moving the rock shaft 49. Thus, if the power unit becomes stuck for some reason, the operator may still have direct control of the wheel brakes.

The casing 26 of the power brake unit is shown in section in Figure 3, in which appears the propeller shaft 29 having mounted thereon a splined sleeve 55 held by the key 56. Extending upward from the rock lever 49 past the sides of the propeller shaft are the yoke arms 57 and 58 having thrust ends 59 and 60.

It has not been necessary to describe in detail the operating parts of the power brake unit, but it will be understood that the yoke arms 57 and 58 are normally in thrust engagement with an operating sleeve which is laterally slidable relative to the power shaft, whereby lateral movement of the sleeve will serve to rock the rock lever 49 and transmit a pull to the brake rods. From the rock lever 49 extends a depending arm 61, which is formed with a right angled lower end 62 and is adapted to engage a dashpot plunger 63, having a right angled side opening 64, whereby the arm 61 may be slid laterally into position. The plunger 63 is guided by a sleeve 65, which also has a right angled opening 66 to receive the arm 62. The sleeve 65 forms a cylinder for the dashpot and is mounted in the walls of the casing 26. The cap 67 is secured to the bottom of the casing 26 by the bolts 68, and forms a valve cover to retain certain valves (not shown) in position to control the flow of a lubricant between the ends of a dashpot. Passages 69 and 70 are formed in the cover 67 for the flow of the lubricant between the opposite ends of the dashpot chamber and through the valves. The rock lever 49 is assembled through a side opening 70 of the casing 26, which is closed after the assembling of the rock lever by the cover 71. The cover 71 is secured by the bolts 72 and is formed with a socket portion 73 to provide a bearing for the left-hand spindled end 74 of the rock lever 49. The right-hand side of the rock lever 49 comprises a reduced spindle portion 75 carried by the bearing 76 of the casing 26. The bearing 76 is formed with a recess 77, in which oil sealing means are secured adjacent to the boss 54 of the brake lever 30. The oil sealing means includes a packing ring 78 held by the spring 79. To hold the packing 78 and spring 79 in place, suitable rings are provided enclosed within the recess 77. Thus there is provided a ring 81 having an inner flange 82 and an outer edge 83 which holds a ring 80 in place. The ring 80 has an outer flange 84, which bears against the packing 78 and presses it against the inner ring 85. Thus the packing 78 is held by one edge between the inner ring 85 and the flange 84 of the middle ring 80, while the inner edge of the packing 78 is pressed against the spindle 75 by the spring 79.

It will be apparent that the construction described permits the manufacture of the rock lever, together with the yoke arms 57 and 58, and the depending arm 61, which engages the dashpot plunger, in one piece, and the rock lever may be assembled by inserting from the side through the opening 70 of the casing 26. The spindle end comprising the portions 48 and 75 is passed through the bearing 76 of the casing, and the rock lever is turned to bring the yoke arms in engagement with the operating sleeve. The depending arm 61 is slid laterally into association with the dashpot due to the provision of the openings in the dashpot plunger and the dashpot cylinder. The cover 71 is then secured and the socket 73 receives the end 74 of the rock lever. The brake lever 30 may then be attached to the outwardly extending end 48 of the yoke lever by inserting the buttress keys and sliding the brake lever into place, and the brake lever 30 may be held in place by a snap ring 86.

The oil seal is assembled as a unit and it will be noted that the reduced spindle position 75 of the rock shaft includes a tapered portion 87 in order to permit the assembly of the rock shaft, after the oil seal is in place, without cutting the packing 78.

Various modifications and changes may be resorted to without departing from the spirit of my invention as expressed in the appended claims.

I claim:

1. In combination, a power shaft, a power brake casing enclosing a portion of said power shaft, a rock shaft supported by said casing below said power shaft and transverse thereto, one end of said rock shaft extending through said casing, a brake lever held to said rock shaft end, buttress keys associated with said brake lever and said rock shaft, said brake lever being free to be moved independent of said rock shaft, and said buttress keys transmitting movement to said brake lever upon movement of said rock shaft.

2. In combination, a power shaft, a power brake casing enclosing a portion of said power shaft, a rock shaft supported by said casing, one end of said rock shaft comprising an extension through said casing, an oil seal surrounding said extension and held in said casing, a brake lever mounted on said rock shaft extension adjacent said oil seal, buttress keys forming a connection between said rock shaft and said brake lever and a snap ring holding said brake lever and said buttress keys in place.

3. In combination, a vehicle power shaft, a power brake casing enclosing a portion of said power shaft, an output rock shaft pivotally supported by the walls of said casing below said power shaft and transverse thereto, said rock shaft including an end protruding from said casing and a double arm brake lever mounted on the protruding end of said rock shaft with provision for lost motion, the arms of said brake lever being connected to forwardly and rearwardly extending brake rods.

4. In combination, a vehicle power shaft, a power brake casing enclosing a portion of said power shaft, an output rock shaft pivotally supported by the walls of said casing below said power shaft and transverse thereto, said rock shaft including an end protruding from said casing, said casing including an exterior enlarged opening through which said rock shaft extends, oil sealing means mounted in the enlarged opening of said casing, a double arm brake lever carried by the protruding end of said rock shaft with provision for lost motion, the hub of said brake lever being closely adjacent said oil sealing means and the arms of said brake lever being adapted to be connected to forwardly and rearwardly extending brake rods.

5. In combination, a vehicle power shaft, a power brake casing enclosing a portion of said power shaft, an output rock shaft pivotally supported by the walls of said casing below said power shaft and transverse thereto, said rock shaft including an end protruding from said casing and a brake lever mounted on the protruding end of said rock shaft with provision for lost motion, said brake lever being connected to a wheel brake actuating member.

6. In combination, a vehicle power shaft, a power brake casing enclosing a portion of said power shaft, an output rock shaft pivotally supported by the walls of said casing below said power shaft and transverse thereto, said rock shaft including an end protruding from said casing, said casing including an exterior enlarged opening through which said rock shaft extends, oil sealing means mounted in the enlarged opening of said casing, a brake lever carried by the protruding end of said rock shaft with provision for lost motion, the hub of said brake lever being closely adjacent said oil sealing means and said brake lever being connected to a wheel brake actuating member.

Signed at Chicago, Illinois, this 10th day of June, 1929.

EDWARD A. ROCKWELL.